(12) United States Patent
Kaulbach et al.

(10) Patent No.: US 6,686,426 B2
(45) Date of Patent: Feb. 3, 2004

(54) PERFLUORO COPOLYMERS OF TETRAFLUOROETHYLENE AND PERFLOURO ALKYL VINYL ETHERS

(75) Inventors: Ralph Kaulbach, Emmerting (DE); Helmut Traunspurger, Julbach (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/914,509

(22) PCT Filed: Dec. 22, 2000

(86) PCT No.: PCT/US00/35128
§ 371 (c)(1),
(2), (4) Date: Aug. 28, 2001

(87) PCT Pub. No.: WO01/49759
PCT Pub. Date: Jul. 12, 2001

(65) Prior Publication Data
US 2003/0004291 A1 Jan. 2, 2003

(30) Foreign Application Priority Data
Dec. 30, 1999 (DE) ........................................ 199 64 006

(51) Int. Cl.[7] .............................................. C08F 214/26
(52) U.S. Cl. ........................ 526/247; 526/242; 526/250
(58) Field of Search ................................ 526/247, 250, 526/242

(56) References Cited

U.S. PATENT DOCUMENTS

| | | | |
|---|---|---|---|
| 3,085,083 A | 4/1963 | Schreyer | |
| 3,635,926 A | 1/1972 | Gresham et al. | |
| 3,642,742 A | 2/1972 | Carlson | |
| 4,029,868 A | 6/1977 | Carlson | 526/247 |
| 4,262,101 A | 4/1981 | Hartwimmer et al. | 526/89 |
| 4,380,618 A | 4/1983 | Khan et al. | 526/206 |
| 4,381,387 A | 4/1983 | Sulzbach | 526/247 |
| 4,552,925 A | 11/1985 | Nakagawa et al. | 525/200 |
| 4,743,658 A | 5/1988 | Imbalzano et al. | 525/326.4 |
| 4,864,006 A | 9/1989 | Giannetti et al. | 526/209 |
| 4,920,170 A | 4/1990 | Abe et al. | 526/247 |
| 5,473,018 A | 12/1995 | Namura et al. | 525/200 |
| 5,603,999 A | 2/1997 | Namura et al. | 428/36.92 |

FOREIGN PATENT DOCUMENTS

| | | |
|---|---|---|
| DE | 1 210 794 | 10/1970 |
| EP | 0 075 312 | 3/1983 |
| EP | 0 226 668 | 7/1987 |
| EP | 0 633 274 | * 1/1995 |
| EP | 0 633 274 A1 | 1/1995 |
| WO | WO 97/07147 | 2/1997 |

OTHER PUBLICATIONS

*Modern Fluoropolymers*, John Wiley & Sons, 1997, p. 223, "Melt Processable Tetrafluoroethylene–Perfluoropropylvinyl Ether Copolymers (PFA)".

* cited by examiner

Primary Examiner—Fred Zitomer
(74) Attorney, Agent, or Firm—Dean M. Harts

(57) ABSTRACT

In preparing a fluorinated thermoplastic with good flex life, high thermal conductivity and low average spherolite diameter from tetrafluoroethylene and perfluoro n-alkyl vinyl ether, perfluoro 2-propoxyalkyl vinyl ether is additionally incorporated into the fluorinated thermoplastic. A semicrystalline, thermoplastically processable copolymer is prepared, made from units of the tetrafluoroethylene, from 2 to 10% by weight of units of perfluoro n-propyl vinyl ether and from 0.1 to 6% by weight of units of perfluoro 2-propoxypropyl vinyl ether. The novel copolymer preferably contains fewer than 70 unstable end groups per $10^6$ carbon atoms, has thermal conductivity of at least 0.19 W/mK at 23° C. and has a smooth surface with an average spherolite diameter of <5 µm. The novel terpolymer is suitable for extrusion of hose, in particular for heat exchangers, and also for ultrahigh-purity applications.

15 Claims, 1 Drawing Sheet

EXAMPLE 1

COMPARATIVE EXAMPLE 2

COMPARATIVE EXAMPLE 3

PERFLUORO COPOLYMERS OF TETRAFLUOROETHYLENE AND PERFLOURO ALKYL VINYL ETHERS

1. FIELD OF THE INVENTION

Figure 1:
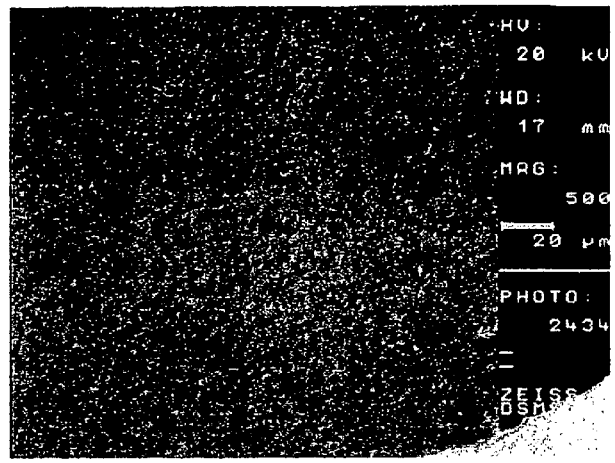
Figure 1:
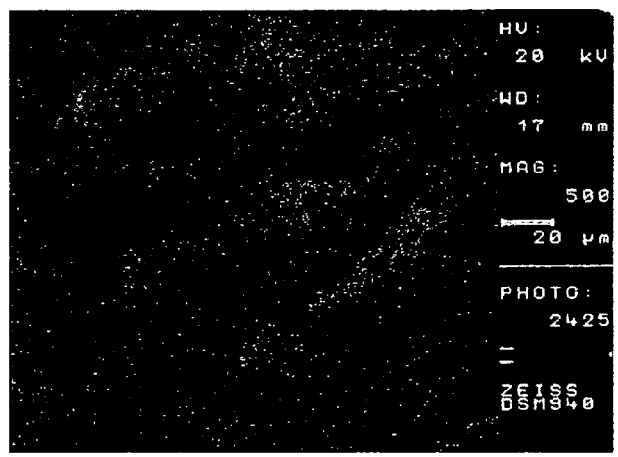
Figure 1:
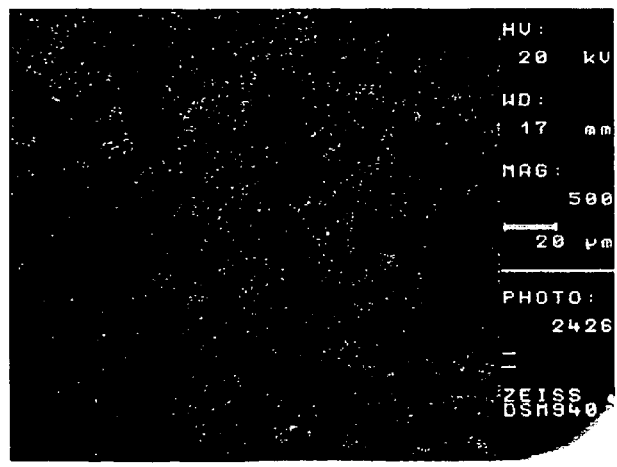

The present invention relates to perfluorinated copolymers of tetrafluoroethylene and perfluoro alkyl vinyl ethers. In particular, the present invention relates to copolymers that include a blend of a linear perfluoro alkyl vinyl ether and a branched perfluoro alkyl vinyl ether. The invention further relates to articles produced therefrom and a method of making molded articles using the perfluoro copolymers.

2. BACKGROUND OF THE INVENTION

Polytetrafluoroethylene (PTFE) is widely used and is well-known for its excellent mechanical properties combined with chemical inertness, heat resistance, non-flammability, anti-stick properties and exceptional dielectric properties. However, a well-known disadvantage of PTFE is also its extreme high melt viscosity making it unsuitable for melt-processing techniques. As a result, the processing of PTFE into desired shapes or articles requires cumbersome techniques such as sintering.

Accordingly, the art has developed melt-processible perfluoropolymers that can be extruded or molded into shapes and that approach the beneficial properties of PTFE as much as possible. For example, copolymers of tetrafluoroethylene (TFE) and hexafluoropropylene (HFP) were the first melt processible perfluoropolymers developed. These copolymers, which are known as FEP polymers, however do not have desired heat stability and high temperature properties as may be desired in some applications. A further known type of melt-processible perfluoropolymers is disclosed in U.S. Pat. No. 3,635,926 and includes copolymers of TFE and perfluoropropylvinyl ether (PVE). These copolymers are known as PFA (perfluoroalkoxy polymers) and have improved heat stability and high temperature performance.

WO 97/07147 discloses copolymers of perfluoro ethyl vinyl ether with TFE and U.S. Pat. No. 4,864,006 discloses copolymers of TFE with perfluoro methyl vinyl ether. Still further known copolymers of TFE with a perfluorovinyl ether monomer are disclosed in U.S. Pat. No. 4,029,868 disclosing a terpolymer of TFE, HFP and a perfluorovinyl ether and in U.S. Pat. No. 4,262,101 disclosing a copolymer of TFE and perfluoroalkylvinyl ether optionally in combination with HFP.

EP 75 312 discloses FEP type of polymers that have from 80 to 95.8% by weight of units derived from TFE, 4 to 14% of units derived from HFP and 0.2 to 6% by weight of units derived from a branched perfluoro alkoxy alkyl vinyl ether. The resulting polymers are taught to have a good moldability and good stress crack resistance. However, since such polymers are of the FEP type, they do not have the desired heat stability and performance at high temperature.

U.S. Pat. No. 4,381,387 discloses copolymers of TFE, ethylene, HFP and a bulky comonomer. These polymers are taught to be suitable for wire coatings and making of extruded articles. However, these polymers are not fully fluorinated and are therefore do not have high chemical and heat resistance.

Copolymers of TFE and perfluoroalkyl vinyl ethers are also used to obtain fluoroelastomers. For example, U.S. Pat. No. 4,920,170 discloses a copolymer that consists of (a) 30 to 80 mol % of TFE, (b) 5 to 60 mol % of perfluoro(lower) alkyl vinyl ether and (c) a perfluoroether of the formula $CF_2=CFOCF_2CFXOR_f$ in which X is F or $CF_3$ and $R_f$ is a perfluoro alkyl group, and wherein the sum of (a), (b) and (c) is 100 mol %. Accordingly, the here disclosed copolymers would have at least 20 mol % of perfluorovinyl ether monomer which makes these polymers elastomeric as opposed to thermoplastic and semicrystalline as is the case for PFA type of perfluoropolymers.

The thermal degradation takes place mainly via the thermally unstable end groups formed during the polymerization, i.e. from the end of the chain. The mechanism of this degradation is described in more detail in "Modern Fluoropolymers", John Wiley & sons, 1997, p. 223. Thermal degradation produces corrosive gases which considerably impair the quality of the final product by way of metal contamination or the formation of small bubbles, and they can corrode tooling and processing machinery. Naturally, the effect increases as molecular weight falls (lower melt viscosity). Degradation can be substantially suppressed by using postfluorination to convert the thermally unstable end groups into stable $CF_3$ end groups, for example as in U.S. Pat. No. 4,743,658 and DE-A-1 901 872.

Another problem associated with thermoplastic semicrystalline copolymers of TFE is the so called mechanical degradation which is believed to proceed through chain breakage during processing of the copolymer. As a result, the lower molecular weight fraction formed may negatively impact the mechanical properties, in particular flex life and stress crack resistance.

Similarly, low molecular weight fractions may also result from the polymerization method by which the copolymers are produced. For example, aqueous emulsion polymerization is often used to produce the aforementioned polymers which generally leads to the presence of a small fraction of low molecular weight polymer. As a result, these polymers may also have less than desirable mechanical properties such as pressure cycle resistance, flex life and creep rupture strength.

Further PFA type polymers are semicrystalline and include spherolites which reduce the transparency. The level of transparency depends on the size of the spherolites that are present in the polymer. Generally, these spherolites will have an average size of 5 μm to 10 μm or even more. Also, because of the presence of large sized spherolites, the surface of articles produced is somewhat rough and therefore picks up dust. It would thus be desirable to further reduce the dust pick-up.

3. SUMMARY OF THE INVENTION

Despite the many known thermoplastic perfluorocopolymers of TFE, there continues to exist a need to find further perfluorocopolymers of TFE that are melt-processible and that have desirable properties. It is desired to find perfluorocopolymers of TFE that have high temperature resistance, high chemical resistance, easy processing, good mold release and good mechanical properties in particular better flex life in combination with better transparency, and better surface smoothness of articles produced from the polymer. It is further desirable to find perfluoropolymers that are particularly suitable for making hoses and pipes particularly for use in heat exchange applications.

In accordance with the present invention, thermoplastic semicrystalline copolymers of TFE and a mixture of a first and second perfluoro vinyl ether and wherein the copolymers have a melting point of at least 285° C., preferably at least 300° C. are provided. In particular, the first perfluoro vinyl ether ether is a perfluoro n-alkylvinyl ether having 1 to 4 carbon atoms in the alkyl group and the second perfluoro vinyl ether corresponds to the formula:

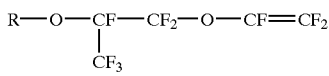
(I)

$$R-O-CF(CF_3)-CF_2-O-CF=CF_2$$

wherein R represents a linear perfluoro alkyl group having 1 to 4 carbon atoms.

Such perfluoropolymer can be produced with a thermal conductivity at 23° C. of at least 0.19 W/mK and have particularly suitable properties for use in applications such as hoses and pipes, in particular for heat exchange applications. Beneficial properties of such polymers include a good flex life and good transparency.

The thermoplastic perfluorocopolymers of TFE and the mixture of the first and second perfluoro vinyl ether that have a melting point of at least 285° C., preferably at least 300° C.

generally have small sized spherolites when made into an article through for example molding or extrusion. Accordingly, in a further aspect, the invention relates to an article of a thermoplastic, semicrystalline fluoropolymer having a melting point of at least 285° C. and comprising repeating units derived from tetrafluoroethylene, repeating units derived from a first vinyl ether monomer and repeating units derived from a second vinyl ether monomer, wherein said first vinyl ether is a perfluoro n-alkylvinyl ether having 1 to 4 carbon atoms in the alkyl group and said second vinyl ether is a perfluoro vinyl ether having the formula:

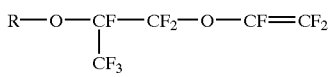
(I)

wherein R represents a linear perfluoro alkyl group having 1 to 4 carbon atoms and wherein said article comprises spherolites having an average diameter of less than 5 μm, preferably 2 μm or less as determined by electron microscopy. These polymers are particularly suitable for preparing articles such as pipes or hoses that have a smooth surface making such surface less prone to picking up dust particles.

Preferred perfluoropolymers of the invention are thermoplastic, semicrystalline perfluoropolymers comprising repeating units derived from tetrafluoroethylene in an amount of 84% to 97.9% by weight, between 2 and 10% by weight of repeating units derived from a first vinyl ether monomer and between 0.1 and 6% by weight of repeating units derived from a second vinyl ether monomer, wherein the first vinyl ether is a perfluoro n-alkylvinyl ether having 1 to 4 carbon atoms in the alkyl group and the second vinyl ether is a perfluoro vinyl ether having the formula:

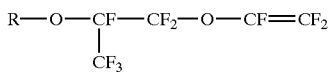
(I)

wherein R represents a linear perfluoro alkyl group having 1 to 4 carbon atoms.

The preferred perfluoropolymers have desirable properties such as high flex life, improved transparency when made into an article, very smooth inner surface when the article is a tube, and desired thermal conductivity properties.

In a final aspect, the present invention also relates to a method of making a molded article with the perfluoropolymers and to molded articles produced therewith. The perfluoropolymers generally also exhibit desired processing properties such as good mold release.

4. DETAILED DESCRIPTION OF THE INVENTION

The perfluoropolymers of the invention are polymers that comprise repeating units derived from TFE and repeating units derived from a mixture of a first and second vinyl ether. The perfluoropolymer generally has a melting point of at least 285° C., preferably a melting point of at least 300° C. The first vinyl ether comonomer is a perfluoro n-alkylvinyl ether wherein the alkyl group has from 1 to 4 carbon atoms. Examples of such comonomers include perfluoro methylvinyl ether, perfluoro ethylvinyl ether, perfluoro n-propylvinyl ether and perfluoro n-butylvinyl ether. Particularly preferred is perfluoro n-propylvinyl ether.

The second vinyl ether included in the perfluorocopolymer is a perfluoro vinyl ether corresponding to the formula:

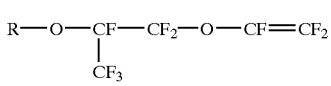
(I)

wherein R represents a linear perfluoro alkyl group having 1 to 4 carbon atoms. Examples of the second vinyl ether include those in which R represents methyl, ethyl, n-propyl and n-butyl. The vinyl ether according to formula (I) in which R represents n-propyl is particularly preferred.

Generally, the perfluorocopolymer will include between 84% to 97.9% by weight of repeating units derived from TFE, between 2 and 10% by weight of repeating units derived from the first vinyl ether and between 0.1 and 6% by weight of repeating units derived from the second vinyl ether. According to a particularly preferred embodiment, the amount of the first vinyl ether will be between 2 and 6% by weight and the amount of the second vinyl ether will not exceed 3% by weight. Also, preferably the weight ratio of the first vinyl ether to the second vinyl ether is at least 6:1.

The perfluorocopolymer may include further perfluorinated monomers such as for example hexafluoropropylene but only to the extend they do not impair obtaining the desired properties. Generally, when present, the repeating units derived from additional perfluorinated monomers will be less than 4%.

The perfluoropolymers according to the invention generally have an improved thermal conductivity relative to similar PFA type of perfluorocopolymers known in the art that do not include a mixture of the first and second perfluoro vinyl ether. In particular, perfluoropolymers having a thermal conductivity of 0.19 W/mK can be obtained. Such perfluoropolymers are particularly suitable for making hoses and pipes for heat exchange applications.

Additionally, the perfluoropolymers of the invention allow the production of articles such as hoses and pipes that have a smoother surface without the need for additional nucleation with PTFE as disclosed in U.S. Pat. Nos. 5,473,018 and 5,603,999. Generally, articles can be produced from the perfluoropolymers of the invention that have spherolites with an average diameter of less than 5 μm or even 2 μm or less.

The perfluoro copolymers of this invention can be made by aqueous emulsion polymerization as disclosed in U.S. Pat. No. 3,635,926 and 4,262,101, preferably in the absence of non-aqueous solvent. Other methods employing a non-aqueous medium can also be used such as for example disclosed in U.S. Pat. No. 3,642,742.

The present invention particularly provides a process for preparing fluorinated thermoplastics from tetrafluoroethylene, perfluoro n-propyl vinyl ether and which comprises additionally incorporating perfluoro 2-propoxypropyl vinyl ether into the fluorinated thermoplastic.

For aqueous emulsion polymerization, a broad range of temperatures can be used. Because of heat transfer considerations and the use of thermally activated initiators, higher temperatures are advantageous, such as temperatures in the range of about 50°–100° C.

Surfactants generally suitable for use in emulsion polymerization of TFE copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators that can be employed in the emulsion polymerization of the perfluoro copolymers are water-soluble free-radical initiators such as ammonium persulfate (APS), potassium persulfate (KPS), or disuccinic acid peroxide, or redox systems such as those based on potassium permanganate. APS and/or KPS is preferred.

Chain transfer agent (CTA) can also be used in aqueous polymerization of the perfluoro copolymers of this invention, and use of CTA is preferred. A wide range of compounds can be used as CTA. Such compounds include, for example, hydrogen-containing compounds such as molecular hydrogen, the lower alkanes, and lower alkanes substituted with halogen atoms. The chain transfer activity of such compounds when used can result in copolymer having —$CF_2H$ end groups which are relatively stable. The CTA can contribute other relatively stable end groups, depending on the identity of the CTA. Preferred CTAs include methane, ethane, and substituted hydrocarbons such as methyl chloride, methylene chloride and chloroform. The amount of CTA used to achieve desired molecular weight will depend, for given polymerization conditions, on the amount of initiator used and on the chain transfer efficiency of the chosen CTA. Chain transfer efficiency can vary substantially from compound to compound, and varies with temperature.

The thermal stability of the perfluoro polymers of the invention can be further improved by converting any thermally unstable end groups into stable —$CF_3$ end groups, through fluorination of the agglomerate or granulated melt. The resulting perfluoro polymers preferably have fewer than 70 unstable end groups per $10^6$ carbon atoms. This can reduce corrosion of processing machinery and reduce metal contamination of the products produced from the perfluoro polymers.

The perfluoro polymers of the invention can be melt processed including for example by extrusion and molding techniques including injection molding and transfer molding. Particularly when processed via molding, beneficial properties of the perfluoro polymers were found. For example in transfer molding for lining ball-valve bodies, the perfluoropolymers of the invention were found to perform better than prior art perfluorocopolymers of the PFA type. In particular the perfluoro polymers of the invention can be demolded very easily under conditions in which prior art PFA type of polymers are generally difficult to demold. This improvement gives marked advantages in processing, since a considerable portion of faulty production in transfer molding is attributable to poor demoldability.

The invention will now be further illustrated by reference to the following examples without however the intention to limit the invention thereto.

EXAMPLES

Abbreviations:
PPVE-1: perfluoro n-propylvinyl ether
PPVE-2: $CF_3CF_2CF_2$—O—$CF(CF_3)$—$CF_2$—O—CF=$CF_2$
MFI: melt flow index Test Methods:

The content of perfluorinated comonomers (U.S. Pat. No. 4,029,868, U.S. Pat. No. 4,552,925) and the number of end groups (EP-B-226 668, U.S. Pat. No. 3,085,083) are determined by IR spectroscopy, using a Nicolet Magna 560 FTIR. The total number of end groups is given by the number of isolated and bonded COOH groups, $CONH_2$ groups and COF groups. The total content by weight of a perfluoro vinyl ether (first and second vinyl ether) is calculated from the quotient of the signals for wavelengths 998 $cm^{-1}$/12365 $cm^{-1}$, using the factor 0.95.

The amount of PPVE-2 incorporated is determined via a separate polymerization of TFE and PPVE-2 (Comparative Example 1). The proportion of PPVE-2 incorporated is determined by the IR method described in EP-B-75 312. The total content by weight of PPVE-2 is calculated from the quotient of the signals for wavelengths 1340 $cm^{-1}$/2365 $cm^{-1}$, using the factor 2.4. A PPVE-2 content of 0.5% by weight was determined using this method.

The difference between the total content of perfluoro vinyl ether and 0.5% by weight of PPVE-2 gives the content of PPVE-1 incorporated.

The MFI gives, in grams per 10 minutes, the amount of a melt extruded from a feed cylinder through a die under a piston loaded with weights. The dimensions of die, piston, feed cylinder and weights have been standardized (DIN 53735, ASTM D-1238). All of the MFIs mentioned here were determined using a 2.1 mm die with a length of 8 mm, for an applied weight of 5 kg and a temperature of 372° C.

Flex life tests are carried out on films of 0.3 mm thickness. The device used here is model 956, No. 102 from Frank, year of construction 1967. The film strips required to determine flex life are 15 mm wide and have a minimum length of 100 mm. To this end, adhesive strips are used to hold a piece of film of approximately DIN A5 size onto the drum of a film cutter, a draw-knife system is put in place and the cutting drum is rotated to manufacture strips at the given knife separation. The film strips are clamped into the screw clamps of the flex life machine and loaded with an attached weight of 1529.6 g. The freely suspended film strips are flexed in both directions to an angle of 90° at the clamping system with a flexing frequency of 250 double-flexures per minute until fracture occurs. The number of double-flexures here is recorded by a counter located above the tester. The figure given is the number of cycles before the film fractures. The flex life of a material is calculated as the average value of the number of double-flexures from the three measurement locations available on each occasion.

Thermal conductivity measurements are made on a double-plate thermal conductivity tester to DIN 52 612, Part 1, method A, using pressure-sintered-plate specimens with diameter 180 mm and thickness 5 mm.

Average spherolite diameter is determined from a scanning electron micrograph of internal surfaces of extruded hose. A Zeiss DSM 940 was utilized for this with magnification 500, 20 kV and an angular setting of 17 mm.

In the examples below percentages and ratios given are based on weight unless otherwise stated.

Comparative Example 1

A polymerization reactor with a total volume of 40 l, provided with an impeller agitator, is charged with 25 l of deionized water. The reactor is sealed off and then atmospheric oxygen is removed by cycles of interspersed evacuation and flushing with nitrogen, and the vessel is heated to 63° C. 122 g of ammonium perfluorooctanoate in the form of a 30% strength solution, and also 100 g of PPVE-2, are then added into the vessel. The agitator rate is set at 240 rpm. TFE is then introduced until the overall pressure achieved is 13.0 bar. 19 g of methylene chloride are then added into the vessel. The polymerization is initiated by pumping in 2 g of ammonium peroxodisulfate (APS), dissolved in 100 ml of deionized water. As soon as the pressure begins to fall, more TFE is introduced via the gas phase so that the overall pressure of 13.0 bar is maintained. The heat generated is dissipated by cooling the vessel wall, keeping the temperature constant at 63° C. After a total of 7.2 kg of TFE have been fed into the reactor, monomer feed is interrupted and the pressure is released from the reactor, which is flushed several times with $N_2$. The resultant copolymer has a PPVE-2 content of 0.5%.

Example 1

A polymerization reactor with a total volume of 40 l, provided with an impeller agitator, is charged with 25 l of deionized water. The reactor is sealed off and then atmospheric oxygen is removed by cycles of interspersed evacuation and flushing with nitrogen, and the vessel is heated to 63° C. After evacuation, 122 g of ammonium perfluorooctanoate in the form of a 30% strength solution, and also 100 g of PPVE-2, are added into the vessel. 180 g of PPVE-1 are then pumped in. The agitator rate is set at 240 rpm. TFE is then introduced until the overall pressure achieved is 13.0 bar. 19 g of methylene chloride are then added into the vessel. The polymerization is initiated by pumping in 2 g of APS, dissolved in 100 ml of deionized water. As soon as the pressure begins to fall, more TFE and PPVE-1, in a feed ratio PPVE-1/TFE of 0.038, are introduced via the gas phase so that the overall pressure of 13.0 bar is maintained. The heat generated is dissipated by cooling the vessel wall, keeping the temperature constant at 63° C. After a total of 7.2 kg of TFE have been fed into the reactor, monomer feed is interrupted and the pressure is released from the reactor, which is flushed several times with $N_2$.

The resultant 31.5 kg of polymer dispersion with a solids content of 22.8% are discharged at the base of the reactor. The dispersion is transferred into a 180 l coagulation vessel and made up to 100 l with deionized water, mixed with 200 ml of concentrated hydrochloric acid and agitated until the solid has separated from the aqueous phase. The flocculant powder precipitated is agglomerated with 6.9 l of a petroleum fraction, the petroleum fraction is driven off using steam, and the granules are then washed six times by way of vigorous and thorough stirring with 100 l of deionized water on each occasion. The moist powder is dried for 12 hours at 260° C. in a drying cabinet. This gives 7.1 kg of a terpolymer which has a PPVE-1 content of 3.6%, a PPVE-2 content of 0.5% and an MFI of 1.8. After granulation of the melt this material has an MFI of 2.1.

Comparative Example 2

The polymerization is carried out as described in Example 2, but this time without adding PPVE-2 and with a feed ratio PPVE-1/TFE of 0.042. The work-up is also as in Example 2. This gives 7.0 kg of a copolymer which has a PPVE-1 content of 4.0% and an MFI of 1.9. After granulation of the melt this material has an MFI of 2.1.

Comparative Example 3

The product from Comparative Example 1 is subjected to postfluorination in order to convert all unstable end groups into stable —$CF_3$ end groups. A 4 l reactor is charged with 2 kg of product of Comparative Example 1. During the heating to 140° C., atmospheric oxygen and moisture are removed by cycles of interspersed evacuation and flushing with nitrogen. The space in the reactor is then filled with a $F_2/N_2$ mixture comprising 10% of $F_2$. The reaction runs for 5 hours, and after each hour the $F_2/N_2$ mixture is renewed. During cooling from 140° C. to room temperature, unreacted fluorine is removed by cycles of interspersed and evacuation flushing with $N_2$. The resultant product has only about <20 end groups per $10^6$ carbon atoms (COF, COOH, $CONH_2$), corresponding to about 10% of the thermally unstable end groups originally present.

Example 2

The materials from Example 1 and Comparative Example 2 were compared with one another for thermal conductivity. The PPVE-2-containing PFA material from Example 2 has 25% higher thermal conductivity than a comparable PFA material from Comparative Example 2 and containing only PPVE-1 over a temperature range from 23 to 160° C. The stabilized material from Comparative Example 3 also has markedly lower thermal conductivity.

| Thermal conductivity given in W/mK | | | |
|---|---|---|---|
| Temperature [° C.] | Example 1 | Comparative Example 2 | Comparative Example 3 |
| 23 | 0.19 | 0.155 | 0.167 |
| 60 | 0.198 | 0.163 | 0.173 |
| 80 | 0.20 | 0.161 | 0.178 |
| 100 | 0.204 | 0.168 | 0.181 |
| 160 | 0.204 | 0.167 | 0.182 |

Example 3

The materials from Example 1 and Comparative Example 2 are studied in transfer molding, by using these to line a ball-valve body. The PFA material copolymerized with PPVE-2, from Example 1, gives markedly better demolding than the material from Comparative Example 2 and has higher transparency, a smoother surface and better adhesion to the lined ball-valve body.

| Ball-valve body DN 50 PN 18 | |
|---|---|
| Mold size/mold diameter: | 100 to 50 mm |
| Mold height: | 120 mm |
| Processing conditions: | |
| Fill height: | 80 mm |
| Melt temperature: | 365° C. |
| Mold temperature: | 365° C. |
| Preheat time: | 180 min |
| Pressure: | 130 bar |

-continued

| Ball-valve body DN 50 PN 18 | |
|---|---|
| Volume flow: | 180 mm/min |
| Holding pressure time: | 25 min |
| Cooling: | 15 min air/10 min water |

| | Comparative Example 2 | Example 1 |
|---|---|---|
| Adhesion (%) | 90 | 100 |
| Blisters | 0 | 0 |
| Transparency | 2–3 | 1 |
| Surface | 0–1 | 0 |
| Cracks | 0 | 0 |
| Demolding | 3–4 | 1–2 |

(Evaluation from 0 = very good to 5 = very poor)

Example 4

Using the materials produced from Example 1 and from Comparative Examples 2 and 3, hose with an external diameter of 20 mm and a wall thickness of 2 mm is produced on hose-extrusion equipment.

| Processing conditions: | |
|---|---|
| Die: | |
| External annular diameter: | 55.9 mm |
| Internal annular diameter: | 44.7 mm |
| Calibration: | |
| Diameter: | 28 mm |
| DDR* | 8 |
| Balance | 1.0 |
| Melt pressure | 57 bar |
| Melt temperature | 400° C. |
| Extrusion rate: | |
| Throughput: | 9.2 kg/h |
| Temperature profile: | |
| Barrel 1 (infeed): | 360° C. |
| Barrel 2: | 370° C. |
| Barrel 3: | 380° C. |
| Barrel 4: | 390° C. |
| Barrel 5: | 385° C. |
| Flange: | 380° C. |
| Die: | 355° C. |
| Head: | 385° C. |

*DDR: means draw down ratio

Studies of the internal surface of the extruded hose using SEM images (FIG. 1) show that the average spherolite diameter of the PFA material from Example 1, copolymerized with PPVE-2, is markedly smaller, at $\leq 2$ μm, than that of the hose produced with the materials from Comparative Examples 2 and 3.

| | Average spherolite diameter [μm] |
|---|---|
| Example 1 | $\leq 2$ |
| Comparative Example 2 | 20–40 |
| Comparative Example 3 | 10–20 |

Example 5

In contrast to Example 1, here 5.6 g of APS and 35 g of $CH_2Cl_2$ are used during the polymerization. The work-up takes place as described in Example 1. This gives 7.2 kg of a terpolymer which has a PPVE-1 content of 3.6%, a PPVE-2 content of 0.5% and an MFI of 14.6. After granulation of the melt this material has an MFI of 15.1.

Comparative Example 4

The polymerization is carried out as described in Example 1, with 5.6 g of APS and 35 g of $CH_2Cl_2$, but this time without adding PPVE-2 and with a feed ratio PPVE-1/TFE of 0.042. The work-up likewise takes place as described in Example 1. This gives 7.2 kg of a copolymer which has a PPVE-1 content of 3.9% and an MFI of 14.5. After granulation of the melt this material has an MFI of 14.9.

Example 6

The flex life of the products from Example 5 and Comparative Example 4 are studied. Compared with the PFA material containing only PPVE-1, from Comparative Example 4, the PFA product from Example 5, copolymerized with PPVE-2, has 60% higher flex life in both the longitudinal and transverse directions of the film produced.

| | Longitudinal direction | Transverse direction |
|---|---|---|
| Comparative Example 4 | 2611 | 2582 |
| Example 5 | 4524 | 4651 |

What is claimed is:

1. A thermoplastic, semicrystalline perfluoropolymer comprising repeating units of tetrafluoroethylene in an amount of 84% to 97.9% by weight, between 2 and 10% by weight of repeating units of a first vinyl ether monomer and between 0.1 and 6% by weight of repeating units of a second vinyl ether monomer, wherein said first vinyl ether is a perfluoro n-propylvinyl ether and said second vinyl ether is a perfluoro vinyl ether having the formula:

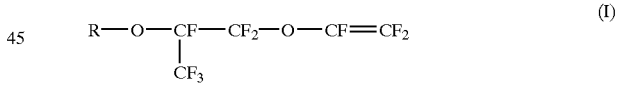

wherein R represents a linear perfluoro alkyl group having 1 to 4 carbon atoms.

2. A thermoplastic, semicrystalline perfluoropolymer according to claim 1 wherein said linear perfluoro alkyl group R in formula (I) represents perfluoro n-propyl.

3. The thermoplastic, semicrystalline perfluoropolymer of claim 1 wherein said perfluoropolymer further comprises repeating units derived from fluorinated monomers other than tetrafluoroethylene and said mixture of first and second vinyl ether monomer.

4. The thermoplastic, semicrystalline perfluoropolymer according to claim 1 wherein the amount of repeating units of said first vinyl ether monomer is between 2 and 6% by weight and wherein the amount of repeating units of said second vinyl ether is between 0.1 and 3% by weight.

5. The thermoplastic, semicrystalline perfluoropolymer according to claim 1 wherein the weight ratio of repeating units of said first vinyl ether to repeating units of said second vinyl ether is at least 6:1.

6. The thermoplastic, semicrystalline perfluoropolymer according to claim 1 wherein said perfluoropolymer has a melting point of at least 285° C.

7. A thermoplastic, semicrystalline perfluoropolymer according to claim 6 wherein the perfluoropolymer has a melting point of at least 300° C.

8. A thermoplastic, semicrystalline perfluoropolymer having a melting point of at least 285° C. and comprising repeating units of tetrafluoroethylene, repeating units of a first vinyl ether monomer and repeating units of a second vinyl ether monomer, wherein said first vinyl ether is a perfluoro n-propylvinyl ether and said second vinyl ether is a perfluoro vinyl ether having the formula:

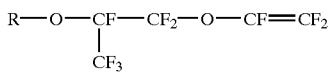 (I)

wherein R represents a linear perfluoro alkyl group having 1 to 4 carbon atoms; and wherein said perfluoropolymer has a thermal conductivity at 23° C. of at least 0.19 W/mK.

9. An article of a thermoplastic, semicrystalline fluoropolymer having a melting point of at least 285° C. and comprising repeating units of tetrafluoroethylene, repeating units derived from a first vinyl ether monomer and repeating units of a second vinyl ether monomer, wherein said first vinyl ether is a perfluoro n-propylvinyl ether and said second vinyl ether is a perfluoro vinyl ether having the formula:

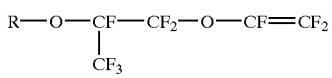 (1)

wherein R represents a linear perfluoro alkyl group having 1 to 4 carbon atoms and wherein said article comprises spherolites having an average diameter of less than 5 μm.

10. An article according to claim 8 or 9 wherein said article is a hose.

11. A method of making a molded article comprising molding a thermoplastic semicrystalline perfluoropolymer as defined in claim 1.

12. Method according to claim 11, wherein said molding comprises transfer molding.

13. A process for preparing fluorinated thermoplastics from tetrafluoroethylene, perfluoro n-propylvinyl ether and, if desired, from other fluorinated monomers copolymerizable therewith, which comprises additionally incorporating perfluoro vinyl ether having the formula:

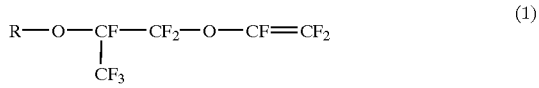 (1)

wherein R represents a linear perfluoro alkyl group having 1 to 4 carbon atoms, into the fluorinated thermoplastic.

14. A process for preparing fluorinated thermoplastics from tetrafluoroethylene, perfluoro n-propyl vinyl ether and which comprises additionally incorporating perfluoro 2-propoxypropyl vinyl ether into the fluorinated thermoplastic.

15. A thermoplastic, semicrystalline perfluoropolymer comprising repeating units of tetrafluoroethylene in an amount of 84 to 96.3% by weight, between about 3.6 and 10% by weight of repeating units of a first vinyl ether monomer and between 0.1 and 6% by weight of repeating units of a second vinyl ether monomer, wherein said first vinyl ether is a perfluoro n-propylvinyl ether and said second vinyl ether is a perfluoro vinyl ether having the formula;

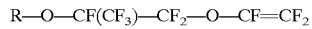 (I)

wherein R represents a linear perfluoro alkyl group having 1 to 4 carbon atoms.

* * * * *

UNITED STATES PATENT AND TRADEMARK OFFICE
CERTIFICATE OF CORRECTION

PATENT NO. : 6,686,426 B2
DATED : February 3, 2004
INVENTOR(S) : Kaulbach, Ralph It is certified that error appears in the above-identified patent and that said Letters Patent is hereby corrected as shown below:

Title page, Item [54] and Column 1, line 3,
Title, "PERFLOURO" should be shown as -- PERFLUORO --

Title page,
Item [56], References Cited, FOREIGN PATENT DOCUMENTS,
-- EP 0 296 559 A    12/28/1998 -- should be added Column 6,
Line 22, "$cm^{-1}/12365$" should be shown as -- $cm^{-1}/2365$ --

Signed and Sealed this

First Day of June, 2004

JON W. DUDAS
*Acting Director of the United States Patent and Trademark Office*